(12) United States Patent
Rajagopal et al.

(10) Patent No.: US 10,326,669 B2
(45) Date of Patent: Jun. 18, 2019

(54) DATA SERVICE POLICY CONTROL BASED ON SOFTWARE DEFINED NETWORK (SDN) KEY PERFORMANCE INDICATORS (KPIS)

(71) Applicant: Sprint Communications Company L.P., Overland Park, KS (US)

(72) Inventors: Arun Rajagopal, Leawood, KS (US); Marouane Balmakhtar, Dumfries, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/117,856

(22) Filed: Aug. 30, 2018

(65) Prior Publication Data

US 2019/0020553 A1    Jan. 17, 2019

Related U.S. Application Data

(63) Continuation of application No. 15/184,298, filed on Jun. 16, 2016, now Pat. No. 10,097,421.

(51) Int. Cl.
*H04L 12/24* (2006.01)
*H04L 12/26* (2006.01)

(52) U.S. Cl.
CPC ................................ *H04L 41/5009* (2013.01)

(58) Field of Classification Search
CPC ......... H04L 41/20; H04L 43/14; H04L 43/08; H04L 43/04
See application file for complete search history.

(56) References Cited

U.S. PATENT DOCUMENTS

| | | | |
|---|---|---|---|
| 8,600,792 B2 | 12/2013 | Drittler et al. | |
| 9,038,151 B1* | 5/2015 | Chua | H04L 45/02 |
| | | | 709/223 |
| 9,210,061 B2 | 12/2015 | Richards et al. | |
| 9,311,160 B2 | 4/2016 | Parker | |
| 2012/0120887 A1* | 5/2012 | Deaton | H04W 16/14 |
| | | | 370/329 |
| 2014/0317261 A1 | 10/2014 | Shatzkamer et al. | |
| 2015/0098475 A1 | 4/2015 | Jayanarayana et al. | |
| 2015/0113132 A1* | 4/2015 | Srinivas | H04L 41/0816 |
| | | | 709/224 |
| 2015/0124622 A1 | 5/2015 | Kovvali et al. | |
| 2015/0149613 A1 | 5/2015 | Kakadia et al. | |

(Continued)

FOREIGN PATENT DOCUMENTS

WO    2015183940    12/2015

*Primary Examiner* — Abdullahi E Salad

(57) ABSTRACT

A wireless communication network delivers a wireless communication service. The wireless communication network comprises a base station computer system and a network server. The base station computer system executes a Network Function Virtualization Infrastructure (NFVI) virtual layer and responsively supports base station Virtual Network Functions (VNFs). The base station computer system executes base station VNFs and responsively delivers wireless communication services and generates base station Key Performance Indicators (KPIs). The network server processes the base station KPIs and responsively directs the base station computer system to modify its support of a base station VNF. The base station computer system modifies its support of the base station VNF responsive to the network server.

16 Claims, 6 Drawing Sheets

(56) References Cited

U.S. PATENT DOCUMENTS

| | | | |
|---|---|---|---|
| 2015/0180730 A1* | 6/2015 | Felstaine | H04L 41/022 709/225 |
| 2015/0263906 A1* | 9/2015 | Kasturi | H04L 41/5019 709/224 |
| 2015/0358248 A1* | 12/2015 | Saha | H04L 43/0817 709/226 |
| 2016/0127169 A1* | 5/2016 | Rosa de Sousa Teixeira | H04L 41/5025 370/216 |
| 2016/0127958 A1* | 5/2016 | Viswanathan | H04W 8/06 370/331 |
| 2016/0352866 A1* | 12/2016 | Gupta | H04L 67/42 |
| 2017/0272523 A1* | 9/2017 | Cillis | H04L 41/082 |
| 2017/0329639 A1* | 11/2017 | Morper | G06F 9/5072 |
| 2018/0060135 A1* | 3/2018 | Lacey | H04W 24/02 |
| 2018/0316730 A1* | 11/2018 | Schaefer | H04L 41/0883 |

* cited by examiner

DATA SERVICE POLICY CONTROL BASED ON SOFTWARE DEFINED NETWORK (SDN) KEY PERFORMANCE INDICATORS (KPIS)

RELATED CASES

This United States Patent Application is a continuation of U.S. patent application Ser. No. 15/184,298 that was filed on Jun. 16, 2016 and is entitled "DATA SERVICE POLICY CONTROL BASED ON SOFTWARE DEFINED NETWORK (SDN) KEY PERFORMANCE INDICATORS (KPIS)." U.S. patent application Ser. No. 15/184,298 is hereby incorporated by reference into this United States Patent Application.

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Software-Defined Networks (SDNs) have become a popular data communication system to deliver these data communication services.

An SDN has applications, controllers, and data machines. The SDN controllers expose network-level control-plane Application Programming Interfaces (APIs) to the SDN applications. The SDN applications call these SDN controller APIs to implement the data communication services. In a like manner, the SDN data machines expose network-level data-plane APIs to the SDN controllers. The SDN controllers call these SDN data machine APIs to implement the data communication services. The SDN data machines process user data in response to the SDN data machine API calls.

For example, an SDN application may determine that an update to an SDN Flow Descriptor Table (FDT) is required to support a user data service. The SDN application calls a controller API with the FDT update. The SDN controller calls a data machine API with the FDT update. The SDN data machine updates its FDT responsive to the data machine API call from the SDN controller. Subsequently, the SDN data machine receives user data packets, matches the packet addresses to an action in the updated FDT, and performs the action on the user data packets. The SDN data machines may forward, drop, or store the user data packets based on the FDT.

Many SDNs execute on Network Function Virtualization (NFV) computer systems. NFV computer systems have Virtual Network Functions (VNFs) that perform like typical communication network elements or portions of these network elements. The VNFs run under the control of a virtual layer (hypervisors, virtual containers, NFV applications) that control VNF access to NFV hardware (circuitry, memory, communication interfaces). To implement a data communication service, an NFV Management and Orchestration (MANO) system drives the NFV hardware to execute and support the VNFs based on NFV service descriptors for the data communication service. In NFV-SDN systems, the VNFs may be SDN applications, SDN controllers, and SDN virtual data machines.

Unfortunately, the ability to exert policy control over data services in SDNs is not optimal. NFV-SDN systems do not support data service policies in an efficient manner. In particular, NFV-SDN systems do not effectively use SDN Key Performance Indicators (KPIs) to select data service polices.

TECHNICAL OVERVIEW

A wireless communication network delivers a wireless communication service. The wireless communication network comprises a base station computer system and a network server. The base station computer system executes a Network Function Virtualization Infrastructure (NFVI) virtual layer and responsively supports base station Virtual Network Functions (VNFs). The base station computer system executes base station VNFs and responsively delivers wireless communication services and generates base station Key Performance Indicators (KPIs). The network server processes the base station KPIs and responsively directs the base station computer system to modify its support of a base station VNF. The base station computer system modifies its support of the base station VNF responsive to the network server.

DETAILED DESCRIPTION

Figure 1:
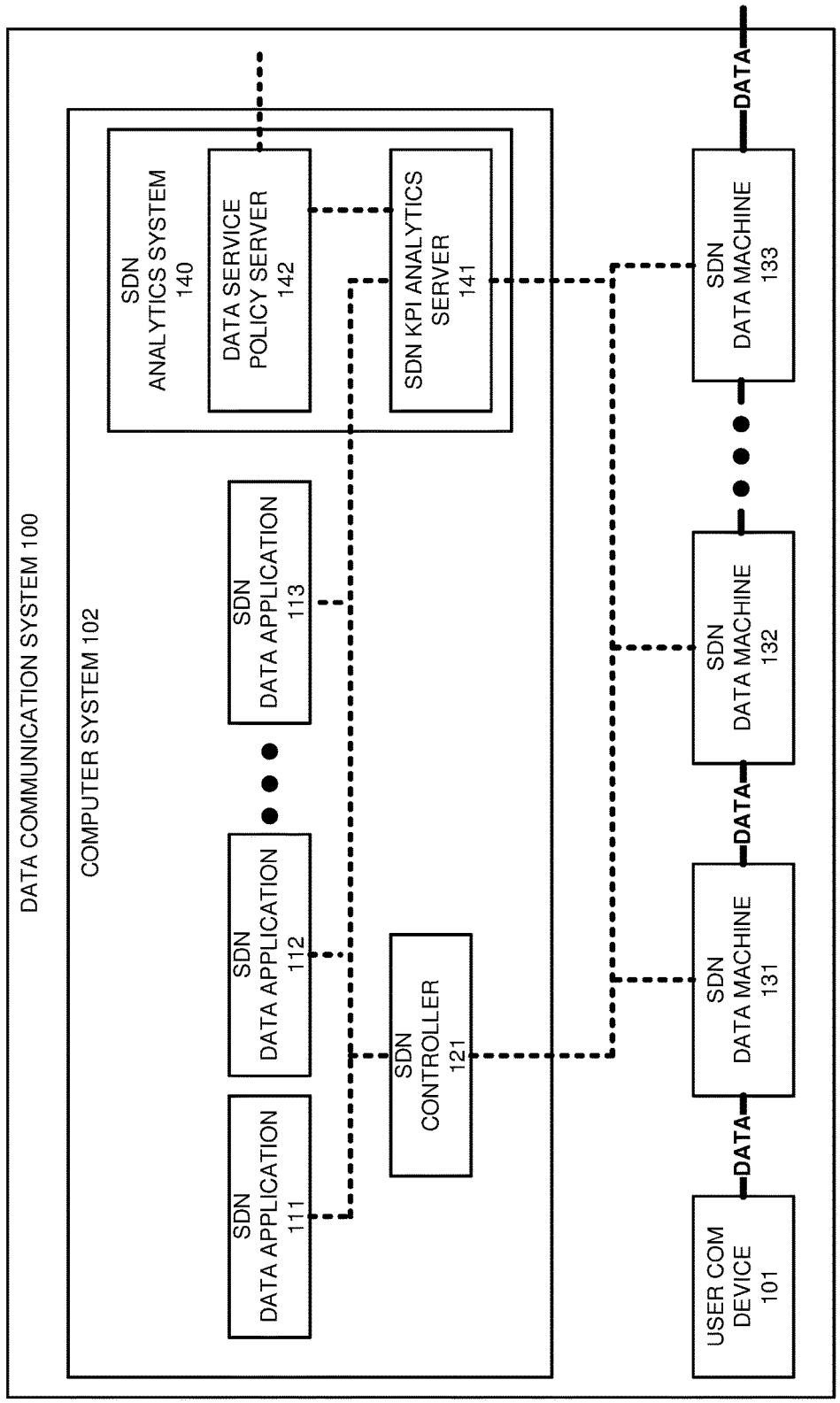
FIG. 1 illustrates a data communication network to exert data service policy control based on Software Defined Network (SDN) Key Performance Indicators (KPIs).

FIG. 1 illustrates data communication network 100 to exert data service policy control based on Software Defined Network (SDN) Key Performance Indicators (KPIs). Data communication system 100 exchanges user data for user communication device 101. User communication device 101 comprises a computer, phone, media player, or some other intelligent machine with a communication transceiver. The data exchange supports a data service such as media streaming, audio/video conferencing, file transfers, internet access, or some other computerized information service. Data communication network 100 comprises user communication device 101, computer system 102, and SDN data machines 131-133. Computer system 102 comprises SDN applications 111-113, SDN controller 121, and SDN analytics system 140. SDN analytics system 140 comprises SDN KPI analytics server 141 and data service policy server 142.

In data communication system 100, computer system 102 and SDN data machines 131-133 comprise data processing circuitry, data memory, operating software, and data communication interfaces. In system 100, virtualized communication links use the processing circuitry and data memory under the control of the operating software. Physical communication links use media such as air, metal, and/or glass, and may include intermediate data devices, systems, and networks. The physical links use protocols like Long Term Evolution (LTE), Wireless Fidelity (WiFi), Ethernet, Wave Division Multiplexing (WDM), Ethernet, Data over Cable System Interface Specification (DOCSIS), Internet Protocol (IP), and/or some other data communication format—including combinations thereof.

SDN applications 111-113 are linked to each other over an east/west SDN interface. SDN applications 111-113 are linked to SDN controller 121 over a northbound SDN interface. SDN controller 121 is linked to SDN data machines 131-133 over a southbound SDN interface. SDN data machine 131 is linked to user communication device 101. SDN data machine 132 is linked to SDN data machines 131 and 133. SDN data machine 133 is linked to an external system (not shown). SDN KPI analytics server 141 is linked to SDN applications 111-113. SDN KPI analytics server 141 is linked to SDN controller 121. SDN KPI analytics server 141 is linked to SDN applications 111-113. SDN KPI analytics server 141 is linked to SDN data machines 131-133 over the southbound interface.

To deliver a particular data service, SDN applications 111-113 and SDN controller 121 execute on computer system 102. SDN applications 111-113 transfer SDN controller Application Programming Interface (API) calls to SDN controller 121. SDN controller 121 receives and processes the SDN controller API calls to generate and transfer SDN data machine API calls. SDN controller 121 transfers the SDN data machine API calls to SDN data machines 131-133. SDN data machines 131-133 receive and process the SDN data machine API calls to perform SDN actions on user data and also to transfer SDN data machine API responses. SDN controller 121 receives the SDN data machine API responses. SDN controller 121 processes the SDN data machine API responses to generate and transfers SDN controller responses to SDN applications 111-113.

SDN applications 111-113 measure SDN application KPIs and transfer SDN application KPI data to SDN KPI analytics server 141—perhaps through SDN controller 121. The KPIs may comprise fairly raw metrics like total southbound messages per hour, or they may be more advanced like a moving average execution time for a specific type of data machine update. The logical distribution of advanced KPI development between the SDN systems and SDN KPI analytics server 141 may vary. SDN controller 121 measures SDN controller KPIs and transfers SDN controller KPI data to SDN KPI analytics server 141. SDN data machines measure SDN data machine KPIs and transfer SDN data machine KPI data to SDN KPI analytics server 141—perhaps through SDN controller 121. SDN KPI analytics server 141 processes the SDN KPI data from SDN applications 111-113, controller 121, and data machines 131-133 to generate various service indices for the data services.

Data service policy server 142 processes the data service indices to generate and/or identify policies for the data services. Data service policy server 142 transfers the data service policies for implementation. The exertion of the data service policy typically comprises a change to the SDN resources, Network Function Virtualization Infrastructure (NFVI) resources, and/or Internet Protocol (IP) networking resources that are consumed by the given data service. The policy control may include directing an NFV/SDN orchestrator to scale one or more of the VNF/SDN applications, controllers, data machines, and computer systems for the data service. Likewise, the policy control may include directing the NFV/SDN orchestrator to configure a new capability in one or more of the VNF/SDN applications, controllers, data machines, and computer systems for the data service.

SDN data machines 131-133 establish user data flows based on user data identifiers. The user data identifiers are typically packet header information like IP address and port, Ethernet address and port, multi-protocol label, and the like. For example, SDN data machine 131 may receive FDT data indicating a user data IP prefix and an SDN machine port, and in response to a packet having the IP prefix, the SDN machine forwards the IP packet over the designated SDN machine port. Other actions like storing, dropping, and flooding may be performed. Data service policy server 142 may generate a specific data service policy for a particular user data identifier and its corresponding user data flow. Thus, data service policy server 142 may generate per-flow policies based on FDT response times, north/south chatter, and east/west chatter for a particular IP prefix, IP address/port, Ethernet Virtual Local Area Network (VLAN) ID, or the like.

In examples where computer system 102 comprises a Network Function Virtualization Infrastructure (NFVI), the data communication service will have a NFV Network Service Descriptor (NSD) with rules for the service that identify VNF Descriptors (VNFDs), VNF Forwarding Graphs (VNFFGs), and Physical Network Function Descriptions (PNFDs). The VNFDs specify requirements for VNFs. The VNFFGs specify VNF/vSW interconnections, and the PNFDs specify vSW/NFVI interconnections. The KPI data may indicate the NSD, VNFD, VNFFG, and/or PNFD. SDN analytics system 140 processes this KPI data to select data service policies for a particular NSD, VNFD, VNFFG, and or PNFD—including combinations thereof.

In an NFVI, SDN applications 111-113 comprise NFV VNFs and vSWs executing on the NFVI. The SDN application VNFs and vSWs transfer the SDN application KPI data. Likewise, SDN controller 121 comprises SDN controller VNFs executing on the NFVI. The SDN controller VNFs transfer the SDN controller KPI data. The KPI data transferred by the SDN VNFs and data machines may now indicate NSDs, VNFDs, VNFFGs, and PNFDs. SDN analytics system 140 may then process the KPI data indicating the NSDs, VNFDs, VNFFGs, and PNFDs to generate data service policies based on KPI data for a particular NSD, VNFD, VNFFG, and PNFD—including combinations thereof.

In a simplified example, SDN KPI analytics server 141 may process KPI data to determine an amount of SDN controller API calls and responses over the northbound interface for a specific data service. Likewise, SDN KPI analytics server 141 may process the KPI data to determine an amount of SDN data machine API calls and responses over the southbound interface for the data service. SDN KPI analytics server 141 may also process the KPI data to determine a corresponding amount of user data handled by SDN data machines 131-133 for the data service. SDN KPI analytics server 141 develops an index for a data service based on these KPIs. A simple index might be: [Index #1=A*(southbound traffic)+B*(northbound traffic)/C*(user data)]; where A, B, and C are normalizing and scaling factors.

In another example, SDN applications 111-113 measure SDN data machine Flow Descriptor Table (FDT) update times based the SDN controller API calls and the SDN controller API responses. SDN KPI analytics server 141 develops other indices for the data service based on FDT-related KPIs for the data service. An index might be: [Index 2=D*(# FDT updates per period)+E*(average FDT update time)/F*(user data handled by the FDTs for the data service in period)]; where D, E, and F are normalizing and scaling factors. Various indices may be developed with the SDN KPI data for various data services in a like manner.

In many implementations, SDN policy server 142 identifies patterns in the data service indices and responsively exerts the policy control based on the identified patterns. The patterns may be combinations of policy thresholds for a set of indices. The patterns may be historically derived from prior indices that were recorded during previous events. A pattern is associated with the policies to be implemented upon a pattern match. For example, a historical pattern for a massive sporting event may be used to scale up and scale down VNFs, vSWs, and the like during future events.

Figure 2:
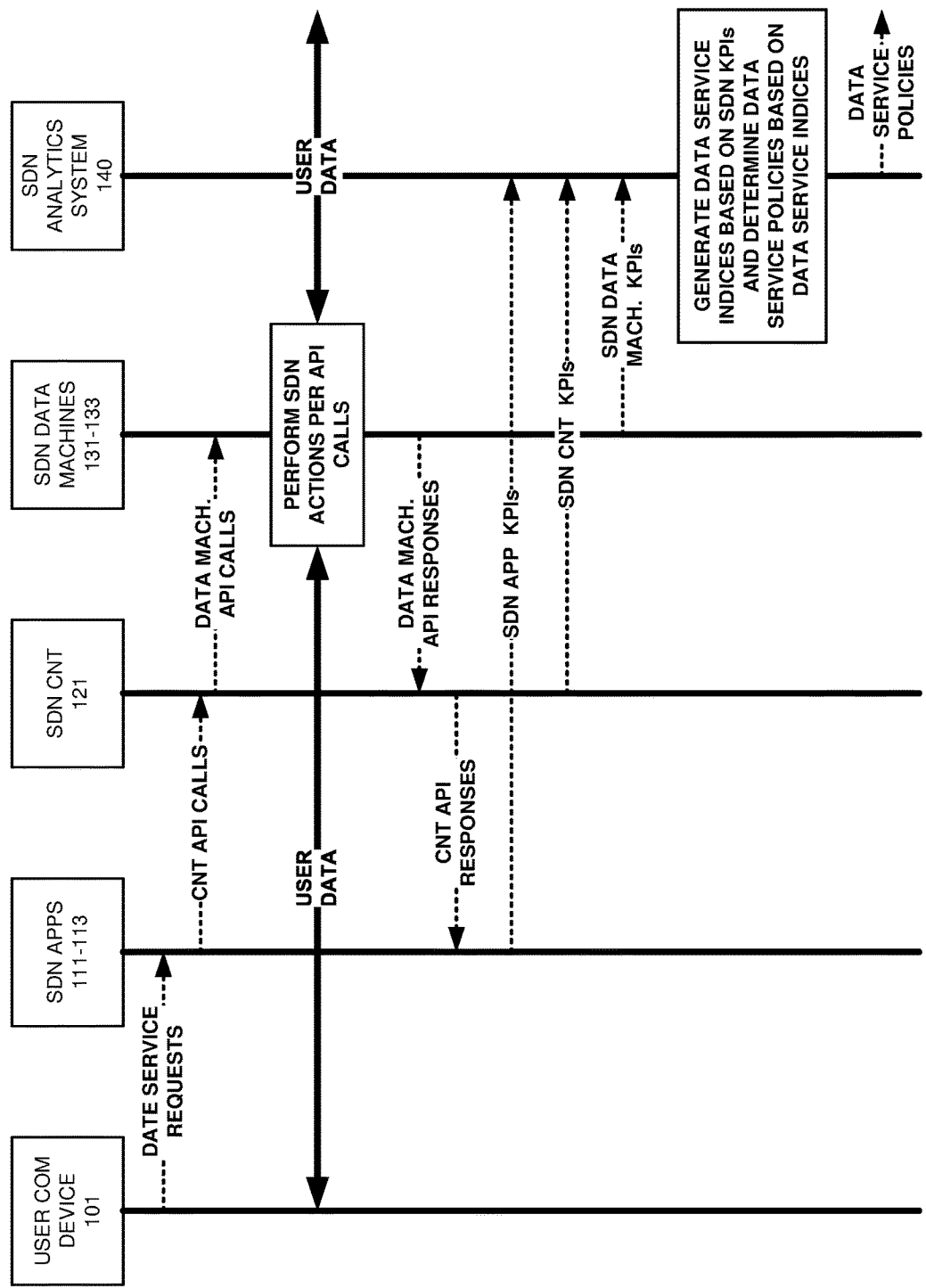
FIG. 2 illustrates the operation of the data communication network to exert data service policy control based on SDN KPIs.

FIG. 2 illustrates the operation of data communication system 100 to exert data service policy control based on SDN KPIs. User communication device 101 transfer data service requests to one or more SDN applications 111-113. SDN applications 111-113 responsively transfer SDN controller API calls to SDN controller 121. SDN controller 121 receives and processes the SDN controller API calls to generate and transfer SDN data machine API calls to SDN data machines 131-133. SDN data machines 131-133 receive and process the SDN data machine API calls to perform SDN actions on the user data to support the data service. SDN data machines 131-133 transfer SDN data machine API responses to SDN controller 121. SDN controller 121 receives and processes the SDN data machine API responses to generate and transfer SDN controller API responses to SDN applications 111-113.

SDN applications 111-113 measure SDN application KPIs and transfer SDN application KPI data to SDN analytics system 140. SDN controller 121 measures SDN controller KPIs and transfers SDN controller KPI data to SDN analytics system 140. SDN data machines 131-133 measure SDN data machine KPIs and transfer SDN data machine KPI data to SDN analytics system 140. SDN analytics system 140 processes the SDN application KPI data, the SDN controller KPI data, and the SDN data machine KPI data to determine various data service indices as described above. SDN analytics system 140 processes the data service indices to determine policies for the data service as described above. SDN analytics system 140 transfers the data service policies to other systems for implementation, like an SDN/NFV orchestrator. SDN analytics system 140 may transfer policies to an SDN orchestrator to scale or otherwise configure one or more of the SDN applications, controllers, data machines, and computer systems for the data service. SDN analytics system 140 may generate the data service policies for a particular IP prefix, IP address, IP port, or Ethernet VLAN.

Figure 3:
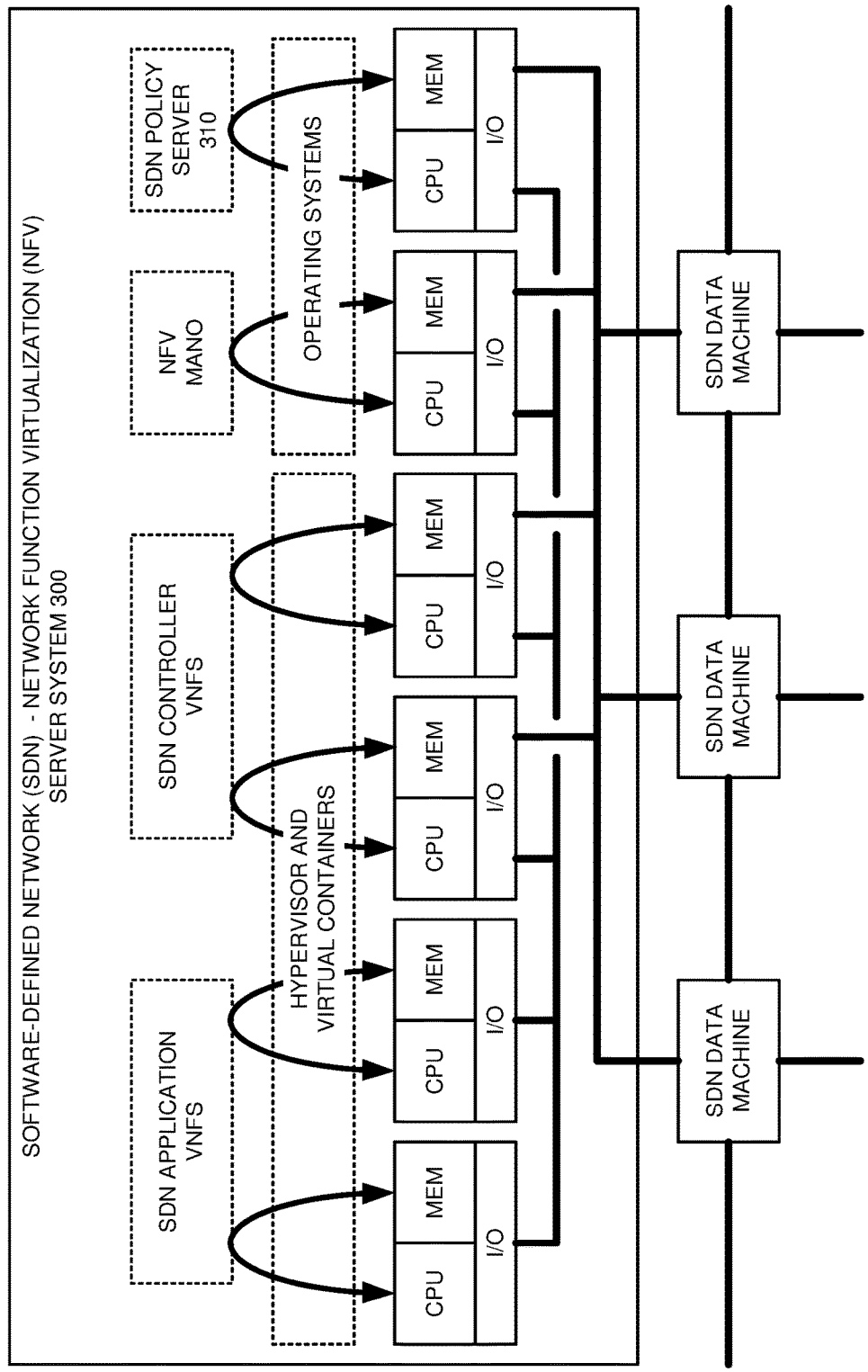
FIG. 3 illustrates an SDN-Network Function Virtualization (NFV) server system to exert data service policy control based on SDN KPIs.

FIG. 3 illustrates Software-Defined Network (SDN)—Network Function Virtualization (NFV) server system 300 to exert data service policy control based on SDN KPIs. SDN-NFV server system 300 is an example of data communication system 100, although system 100 may use alternative configurations and operations. SDN/NFV server system 300 comprises Central Processing Units (CPUs) 301-306, memories 311-316, and Input/Output (I/O) ports 321-326. I/O ports 323-326 are coupled to SDN data machines 331-334. The amount of CPUs, memory, I/O, and software components has been restricted for clarity.

SDN/NFV server system 300 includes hypervisors and virtual containers to provide a virtualized execution environment to the VNFs that comprise SDN applications and controllers. SDN/NFV server system 300 includes an NFV MANO system and SDN policy server 310 that run on one or more operating systems. The NFV MANO system directs the hypervisors and virtual containers to execute the VNFs on the appropriate CPUs and to use the proper memories and I/O ports.

To deliver a data communication service, the MANO system processes a Network Service Descriptor (NSD), VNF Descriptors (VNFDs), VNF Forwarding Graphs (VNFFGs), and Physical Network Function Descriptions (PNFDs). The VNFDs specify requirements for VNFs. The VNFFGs specify VNF/vSW interconnections, and the PNFDs specify vSW/NFVI interconnections. The KPI data may indicate the NSD, VNFD, VNFFG, and/or PNFD. The KPI data may be processed to select data service policies for a particular NSD, VNFD, VNFFG, and or PNFD—including combinations thereof.

In an NFVI, SDN applications 111-113 comprise NFV VNFs and vSWs executing on the NFVI. The SDN application VNFs and vSWs transfer the SDN application KPI data. Likewise, SDN controller 121 comprises SDN controller VNFs executing on the NFVI. The SDN controller VNFs transfer the SDN controller KPI data. The KPI data transferred by the SDN VNFs and data machines may now indicate NSDs, VNFDs, VNFFGs, and PNFDs. SDN analytics system 140 may then process the KPI data indicating the NSDs, VNFDs, VNFFGs, and PNFDs to generate data service policies based on KPI data for a particular NSD, VNFD, VNFFG, and PNFD—including combinations thereof.

The NFV SD drives the MANO system to direct the hypervisors and virtual containers to execute and support the SDN. Responsive to user data service needs, the SDN application VNFs transfer SDN controller API calls to the SDN controller VNFs. The SDN controller VNFs process the SDN controller API calls to generate and transfer SDN data machine API calls. The SDN controller VNFs transfer the SDN data machine API calls to the SDN data machines over vSWs. The SDN data machines receive and process the SDN data machine API calls to perform SDN actions on user data (video, audio, files) and also to transfer SDN data machine API responses. The SDN controller VNFs receive the SDN data machine API responses. The SDN controller VNFs process the SDN data machine API responses to generate and transfer SDN controller responses to the SDN application VNFs.

The SDN application VNFs measure SDN application KPIs and transfer SDN application KPI data to SDN policy server 310. The SDN controller VNFs measure SDN controller KPIs and transfer SDN controller KPI data to SDN policy server 310. This KPI data flow may traverse a VNF Manager (VNFM) and Orchestrator in the MANO system. The SDN data machines measure SDN data machine KPIs and transfer SDN data machine KPI data to SDN policy server 310—perhaps through the SDN controller VNFs, the VNFM, and Orchestrator. SDN policy server 310 processes the SDN KPI data from the SDN application VNFs, SDN controller VNFs, and data machines to generate policies for the data service.

Figure 4:
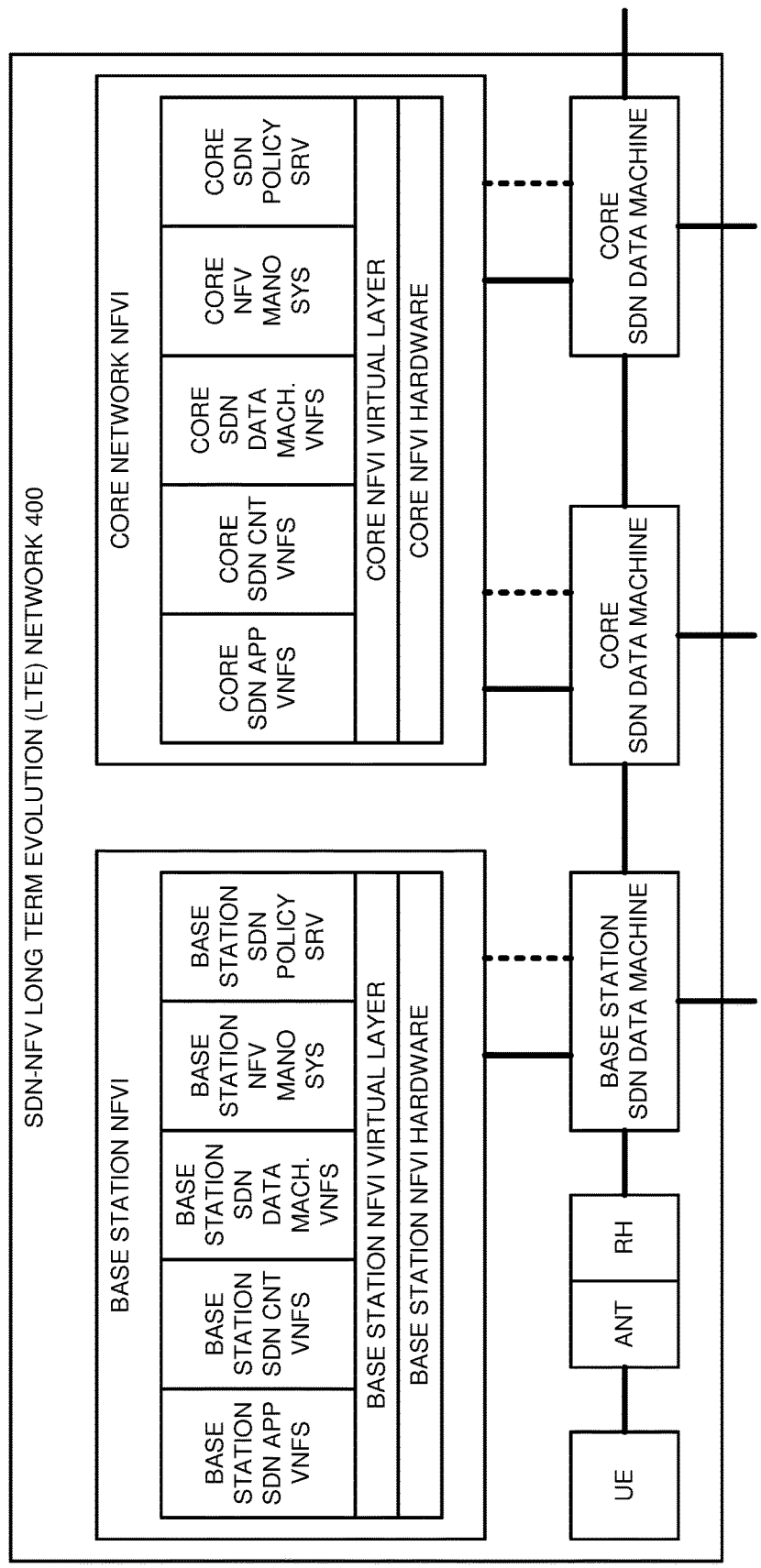
FIG. 4 illustrates an SDN-NFV Long Term Evolution (LTE) network to exert data service policy control based on SDN KPIs.

For example, SDN policy server 310 may receive KPI data that indicates SDN northbound chatter, southbound chatter, FDT updates, user data transfers, and the like. The KPI data also indicates information like NFV SD, FG, VNF, IP prefix, Uniform Resource Identifier (URI), or virtual network identifier. SDN policy server 310 processes the KPI data to determine various indices for the data service, and the indices may be developed for an individual NFV SD, FG, VNF, IP prefix, URI, or virtual network identifier. SDN policy server 310 processes the indices to identify policies to apply to the data service. Typically, the policies entail scaling computer and communication resources for an NFV SD, FG, VNF, IP prefix, URI, or virtual network identifier FIG. 4 illustrates SDN-NFV Long Term Evolution (LTE) network 400 to exert data service policy control based on SDN KPIs. SDN-NFV LTE network 400 is an example of data communication system 100, although system 100 may use alternative configurations and operations. SDN-NFV LTE network 400 comprises: User Equipment (UE), Antenna (ANT), Radio Head (RH), base station NFVI, base station SDN data machine, core NFVI, and core SDN data machines. The base station NFVI and the core NFVI comprise hardware like CPU cores, data memories, and I/O transceivers. The NFVI hardware executes an NFV virtual layer comprising hypervisors, virtual containers, and associated NFV control software to provide a virtualized processing environment. Under the control of the MANO systems, the NFVI virtual layer execute various VNFs to exchange user data for the UE.

In the base station NFVI, the virtual layer executes SDN application VNFs like Baseband (BB), Media Access Control (MAC), Radio Link Control (RLC), Packet Data Convergence Protocol (PDCP), Radio Resource Control (RRC), Ethernet, IP, User Data Protocol (UDP), General Packet Radio Service Transfer Protocol (GTP), and S1-MME signaling. In the core NFVI, the virtual layer executes SDN application VNFs like Serving Gateway (S-GW), Mobility Management Entity (MME), Home Subscriber System (HSS), Secure Gateway (Se-GW), Application Server (AS), Packet Data Network Gateway (P-GW), Policy Charging Rules Function (PCRF), Proxy Call State Control Function (P-CSCF), Interrogating CSCF (I-CSCF), and Service CSCF (S-CSCF).

To set-up a data session, the UE transfers a communication request to a base station application VNF. The request may comprise a Radio Resource Control (RRC) data element coupled with a Non-Access Stratum (NAS) instruction. The base station application VNF informs other base station application VNFs, and one of the base station application VNFs informs one of the core SDN application VNFs. In response, the core SDN application VNFs authorize the UE, select an Application Point Name (APN), and invoke a network bearer for the APN. One of the core SDN application VNF notifies the pertinent base station application VNF of the authorization, APN, and network bearer.

The base station application VNFs transfer SDN controller API calls for the use data session to the base station controller VNFs, and the base station controller VNFs transfer SDN data machine API calls for the user data session to the base station SDN data machine. API responses flow back to the base station controller VNFs and application VNFs. Likewise, the core application VNFs transfer SDN controller API calls for the user data session to the core controller VNFs, and the core controller VNFs transfer SDN data machine API calls for the user data session to the core SDN data machines. API responses flow back to the core controller VNFs and application VNFs. The network bearer traverses the UE, antenna, radio head, and the SDN data machines. If needed, the SDN application VNFs may direct the SDN controller VNFs to drive the SDN data machines to deliver user data to an NFVI for heavier processing by the base station data machine VNFs or the core data machine VNFs. For example, a given flow may be directed through a core data machine VNF to perform transcoding, filtering, encryption, or the like.

The base station SDN application and controller VNFs measure and transfer their SDN KPIs to the base station SDN policy server. The base station SDN policy server transfers these base station SDN KPIs to the core SDN policy server. The core SDN application and controller VNFs measure and transfer their SDN KPIs to the core SDN policy server. The KPI data flow may traverse VNFMs and orchestrators in the base station and/or core NFV MANO systems. The SDN data machines measure SDN data machine KPIs and transfer SDN data machine KPI data to the core SDN policy server—perhaps through the SDN controller VNFs, VNFMs, and orchestrator. The core SDN policy server processes the SDN KPI data from the base station SDN VNFs, core SDN VNFs, and the SDN data machines to select and implement various policies for LTE data communication services.

For example, the core SDN policy server may process amounts of east/west application chatter relative to amounts of processed user data at the base station to implement resource scaling policies through the base station NFV MANO system. In SDN-NFV LTE network 400, a given data communication service has an NFV SD, FG, and VNFs. The KPI data transferred by the SDN VNFs and data machines may indicate the applicable NFV SDs, FGs, vSWs, and VNFs that support the given data service. The KPI data may also indicate the applicable networks, network elements, network functions, data throughput, and the like. The core SDN policy server processes the KPI data to select and implement policies for the data service at the NFVI, SDN, LTE, and/or IP layer.

Figure 5:
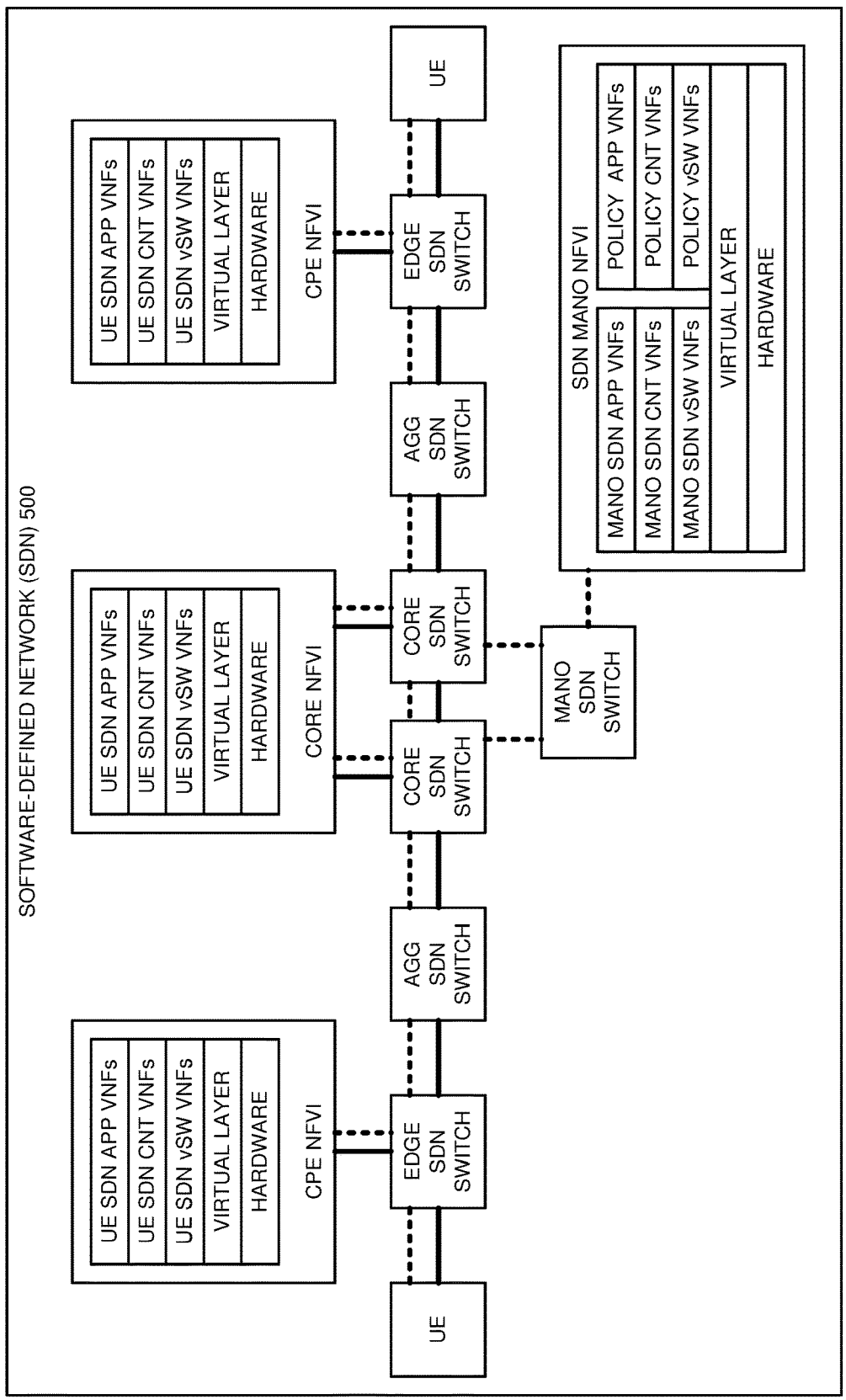
FIG. 5 illustrates an SDN to exert data service policy control based on SDN KPIs.

FIG. 5 illustrates Software-Defined Network (SDN) 500 to exert data service policy control based on SDN KPIs. SDN 500 is an example of data communication system 100, although system 100 may use alternative configurations and operations. SDN 500 comprises: User Equipment (UE), edge SDN switches, aggregation (AGG) SDN switches, core SDN switches, a MANO SDN switch, CPE NFVIs, a core NFVI, and an SDN MANO NFVI. The NFVIs comprise hardware such as CPU cores, flash memories, and I/O transceivers.

The NFVIs execute virtual layer software to provide a virtualized processing environment. Under the control of the MANO system, the virtual layers execute various SDN VNFs. In the NFVIs, the virtual layer executes UE SDN virtual switch (vSW) VNFs, UE SDN controller (CNT) VNFs, and UE SDN application (APP) VNFs. In the MANO NFVI, the virtual layer executes MANO SDN vSW VNFs, MANO SDN CNT VNFs, MANO SDN APP VNFs, policy SDN vSW VNFs, policy SDN CNT VNFs, and policy SDN APP VNFs.

The MANO VNFs transfer networking data to the CPE NFVI virtual layer to drive the execution of the UE SDN VNFs. To set-up a data session, between the UEs, one of the UEs transfers a session request to a CPE UE SDN application VNF. The CPE application VNF informs other CPE application VNFs, and one of the CPE application VNFs informs one of the core SDN application VNFs. In response, the core SDN application VNFs interact with the destination CPE application VNFs to extend the session.

The CPE and core application VNFs transfer SDN controller API calls for the UE session to their associated CPE and core controller VNFs. The CPE and controller VNFs transfer SDN data machine API calls to the SDN switches data machine. API responses flow back to from the switches to the controller VNFs and to the application VNFs. If needed, an SDN application VNF may direct an SDN controller VNF to drive an SDN data machine to deliver user data to an NFVI for heavier processing by the UE SDN vSW VNFs. For example, a given flow may be directed to a core SDN vSW/VNF to perform transcoding, filtering, decryption, or the like.

The UE SDN VNFs in the CPE and core NFVIs generate SDN KPI data as described herein. The SDN switches also generate SDN KPI data. The policy VNFs exchange the SDN KPI data with the UE SDN VNFs and the SDN switches. The MANO VNFs may exchange the SDN KPI data between the UE SDN VNFs and the policy VNFs. The UE SDN VNFs and MANO VNFs may exchange the SDN KPI data between the SDN switches and the policy VNFs.

The policy SDN application VNFs comprise KPI analytics components that process the SDN KPI data from the CPE SDN VNFs, core SDN VNFs, and SDN switches to develop a set of data service indices. The policy SDN application VNFs also comprise indices pattern/policy components. The policy SDN application VNFs process the data service indices against a set of patterns to identify associated policies. For example, the policy SDN application VNFs may process the KPI data like FDT update metrics in the edge SDN switches to match historical growth patterns and apply load balancing policies.

In SDN 500, a given data communication service and its KPI data transferred by the UE SDN VNFs and data switches indicate the applicable NFV SD, FGs, VNFs, networks, network elements, network functions, data throughput, quality-of-service, and the like. The core SDN policy server processes the KPI data to select and implement policies for the data service at the NFVI, SDN, LTE, and/or IP layer.

Figure 6:
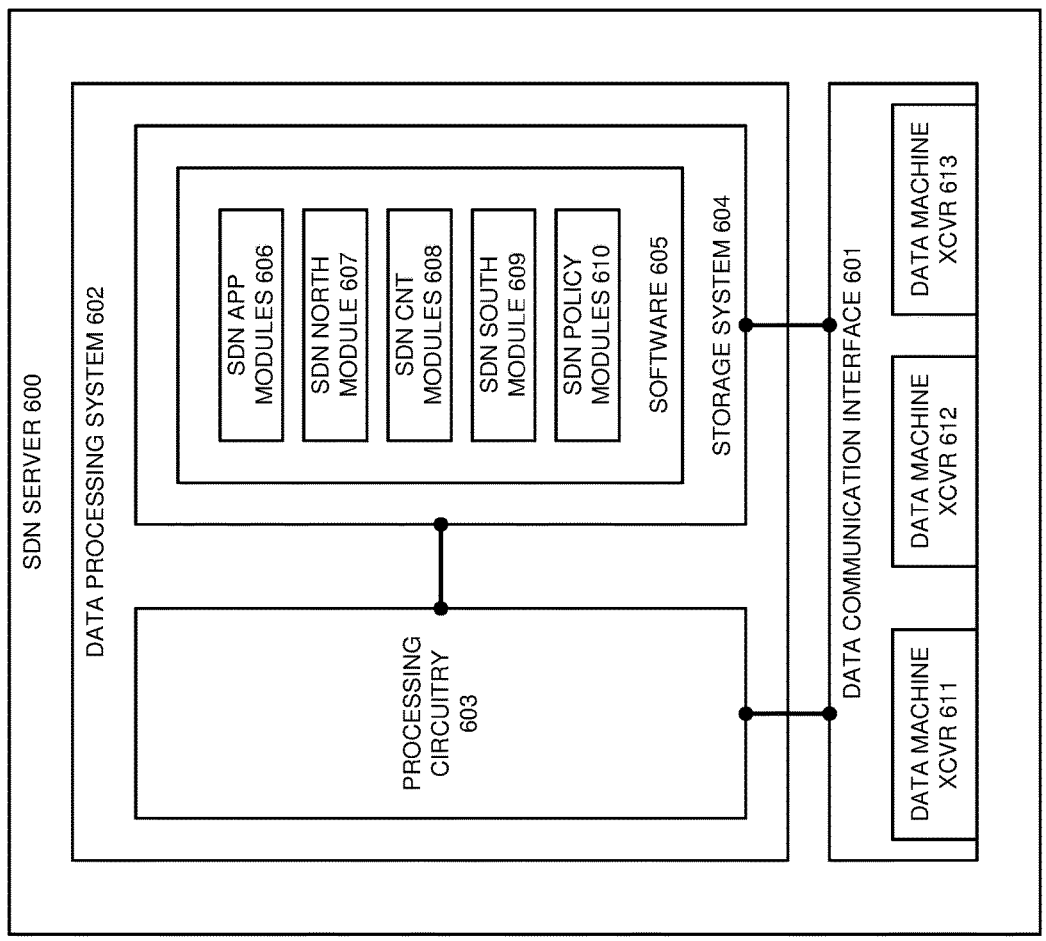
FIG. 6 illustrates an SDN server to exert data service policy control based on SDN KPIs.

FIG. 6 illustrates SDN server 600 to exert data service policy control based on SDN KPIs. SDN server 600 comprises data communication interface 601 and data processing system 602. Data communication interface 601 comprises data machine transceivers 611-616. Data processing system 602 comprises processing circuitry 603 and storage system 604. Storage system 604 stores software 605. Software 605 includes respective software modules 606-610.

Data machine transceivers 611-613 comprise communication components, such as ports, bus interfaces, signal processors, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed. Software 605 includes software modules 606-610 and may also include operating systems, hypervisors, virtual machines/containers, applications, data structures, virtual network elements, utilities, and the like. SDN server 600 may be centralized or distributed. All or portions of software 606-610 may be externally stored on one or more storage media, such as circuitry, discs, and the like. Some conventional aspects of SDN server 600 are omitted for clarity, such as power supplies, enclosures, and the like.

When executed by processing circuitry 603, software modules 606-610 direct circuitry 603 to perform the following operations. SDN application modules 606 process user and network data to drive SDN controller modules 608 to deliver data communication services to users. SDN north module 607 comprises vSWs that exchange these SDN controller API calls and responses between SDN application modules 606 and SDN controller modules 608. SDN controller modules 608 process the SDN controller API calls to generate SDN data machine API calls to drive SDN data machines (not shown) to deliver data communication services to users. SDN south module 609 comprises vSWs that exchange these SDN data machine API calls and responses between SDN controller modules 608 and the SDN data machines over data machine transceivers 611-613. SDN modules 606-609 generate and transfer SDN KPI data like SDN chatter, NFVI transactions, user IP network throughput to implement policies for data service at the NFV, SDN, and/or user network layer.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to deliver a wireless communication service, the method comprising:
   a base station computer system executing a Network Function Virtualization Infrastructure (NFVI) virtual layer and responsively supporting base station Virtual Network Functions (VNFs);
   the base station computer system executing the base station VNFs and responsively delivering the wireless communication service and generating base station Key Performance Indicators (KPIs);
   a network server processing the base station KPIs and responsively directing the base station computer system to modify at least one of NFVI virtual layer support and NFVI hardware support of one of the base station VNFs; and
   the base station computer system modifying the at least one of the NFVI virtual layer support and the NFVI hardware support of the one the base station VNF responsive to the network server direction.

2. The method of claim 1 wherein the one base station VNF comprises a Media Access Control (MAC) VNF.

3. The method of claim 1 wherein the one base station VNF comprises a Radio Link Control (RLC) VNF.

4. The method of claim 1 wherein the one base station VNF comprises a Packet Data Convergence Protocol (PDCP) VNF.

5. The method of claim 1 wherein the one base station VNF comprises a Radio Resource Control (RRC) VNF.

6. The method of claim 1 wherein the one base station VNF comprises a Software Defined Network (SDN) application VNF.

7. The method of claim 1 wherein the one base station VNF comprises a Software Defined Network (SDN) controller VNF.

8. The method of claim 1 wherein the one base station VNF comprises a Software Defined Network (SDN) data machine VNF.

9. A wireless communication system to deliver a wireless communication service, the wireless communication system comprising:
   base station computer circuitry configured to execute a Network Function Virtualization Infrastructure (NFVI) virtual layer and responsively support base station Virtual Network Functions (VNFs), to execute the base station VNFs and responsively deliver the wireless communication service and generate base station Key Performance Indicators (KPIs);

a network server configured to process the base station KPIs and responsively direct the base station computer circuitry to modify at least one of NFVI virtual layer support and NFVI hardware support of one of the base station VNFs; and the base station computer circuitry configured to modify the at least one of the NFVI virtual layer support and the NFVI hardware support of the one base station VNF responsive to the network server direction.

10. The wireless communication system of claim 9 wherein the one base station VNF comprises a Media Access Control (MAC) VNF.

11. The wireless communication system of claim 9 wherein the one base station VNF comprises a Radio Link Control (RLC) VNF.

12. The wireless communication system of claim 9 the one base station VNF comprises a Packet Data Convergence Protocol (PDCP) VNF.

13. The wireless communication system of claim 9 wherein the one base station VNF comprises a Radio Resource Control (RRC) VNF.

14. The wireless communication system of claim 9 of claim 1 wherein the one base station VNF comprises a Software Defined Network (SDN) application VNF.

15. The wireless communication system of claim 9 wherein the one base station VNF comprises a Software Defined Network (SDN) controller VNF.

16. The wireless communication system of claim 9 wherein the one base station VNF comprises a Software Defined Network (SDN) data machine VNF.

\* \* \* \* \*